United States Patent [19]
Jacobson et al.

[11] Patent Number: 5,970,489
[45] Date of Patent: Oct. 19, 1999

[54] METHOD FOR USING REGION-SETS TO FOCUS SEARCHES IN HIERARCHICAL STRUCTURES

[75] Inventors: Guy Jacobson, Bridgewater; Balachander Krishnamurthy, Chatham; Divesh Srivastava, Summit; Dan Suciu, Mountainside, all of N.J.

[73] Assignee: AT&T Corp, Middletown, N.J.

[21] Appl. No.: 08/879,500

[22] Filed: May 20, 1997

[51] Int. Cl.[6] .................................................. G06F 17/30
[52] U.S. Cl. .................................. 707/10; 707/3; 707/9; 395/349; 395/200
[58] Field of Search .................................. 707/3, 10, 4, 9, 707/2, 5, 531, 104; 395/348, 349, 200; 345/329, 349; 348/7, 13

[56] References Cited

U.S. PATENT DOCUMENTS

| | | | |
|---|---|---|---|
| 5,659,729 | 8/1997 | Nielsen | 707/10 |
| 5,737,560 | 4/1998 | Yohanan | 395/349 |
| 5,751,956 | 5/1998 | Kirsh | 395/200 |
| 5,751,961 | 5/1998 | Smyk | 707/3 |

*Primary Examiner*—Wayne Amsbury
*Assistant Examiner*—Thu-Thao Havan

[57] ABSTRACT

A method improves a search in a hierarchical structure by focusing the search to selected regions within the structure. The method defines one or more region-sets and uses the region-set(s) as either a filter for the results of a key-word search or an integrated part of a search engine to increase the efficiency of the search engine. The method also provides for dynamic creation of new region-sets from existing region-sets using a prescribed set of operators.

5 Claims, 3 Drawing Sheets

METHOD FOR USING REGION-SETS TO FOCUS SEARCHES IN HIERARCHICAL STRUCTURES

BACKGROUND OF THE INVENTION

The present invention is directed to focusing searches in hierarchical structures. More specifically, the present invention is directed to using region-sets in conjunction with keyword searches to focus those searches in hierarchical structures such as the World Wide Web.

With the proliferation of electronic information sources it has been necessary to provide searching capabilities to enable users to hunt for information of interest in large collections of electronic documents. It is well known to provide search engines for searching for pages of unstructured text on the World Wide Web, referred to herein as unstructured documents. Examples of such search engines include AltaVista, Lycos and others. These search engines do an effective job of finding many possible matches based on keywords provided by the user. However, the number of matches is often quite large and it is difficult to locate those few documents of particular interest within such a collection of matching documents.

Many of the search engines provide web directories, for example Yahoo (http://www.yahoo.com/) and Infoseek (http://www.infoseek.com) seek to address this problem of too many matches by providing topic-based hierarchical directories that allow users to navigate the topic/sub-topic hierarchy and pose keyword-based queries to locate documents classified under any specific topic of interest. While such directories are useful to locate a few matching documents, their utility is restricted. First, the act of classifying a rapidly growing collection of documents into specific topics is a human/computationally intensive task. Additionally, navigating the topic/sub-topic hierarchy is a very inflexible mechanism of focusing the search and does not allow users to pose keyword-based queries to locate documents classified into multiple topics. As a consequence of these two limitations, the documents that can be located using the web directories may not include a number of existing documents that would be of interest to the user.

It would be advantageous if a mechanism was provided for focusing web searches by augmenting keyword-based searches. In particular, it would be beneficial if a mechanism was provided that enabled the user to specify regions of the hierarchical structure as being of interest whereby the keyword-based search to be undertaken takes these region definitions into account.

SUMMARY OF THE INVENTION

The present invention provides a method for focusing searches in hierarchical structures. In particular, the present invention provides a method for directing a search to regions of the hierarchical structure designated as being of interest to the user.

In an embodiment of the present invention, the hierarchical structure is considered to comprise a universe of documents where the universe includes a plurality of regions. The user can select a set of regions (a region-set) related to one another based on some predetermined criterion. A keyword search is then directed to the selected regions.

Alternatively, a first region-set identifying regions in the universe satisfying a first criterion is created. A second region-set identifying regions in the universe satisfying a second criterion is also created. A third region-set can then be created from the first two region-sets in accordance with a third criterion. Documents from regions in the third region-set are then produced in response to a keyword search of the universe.

In accordance with the present invention, this method can be implemented as a filter operating on results of a keyword search of a universe of documents. Alternatively, the method of the present invention can be combined with the search of the documents using the keywords to optimize the searching operation.

While the present invention is employable in hierarchical structures in general, one particular embodiment of the present invention is described in relationship to searching for documents on the World Wide Web. Alternatively, the method of the present invention could be used to focus searching in connection with another hierarchically structured information space such as a UNIX file system.

DETAILED DESCRIPTION

Figure 1:
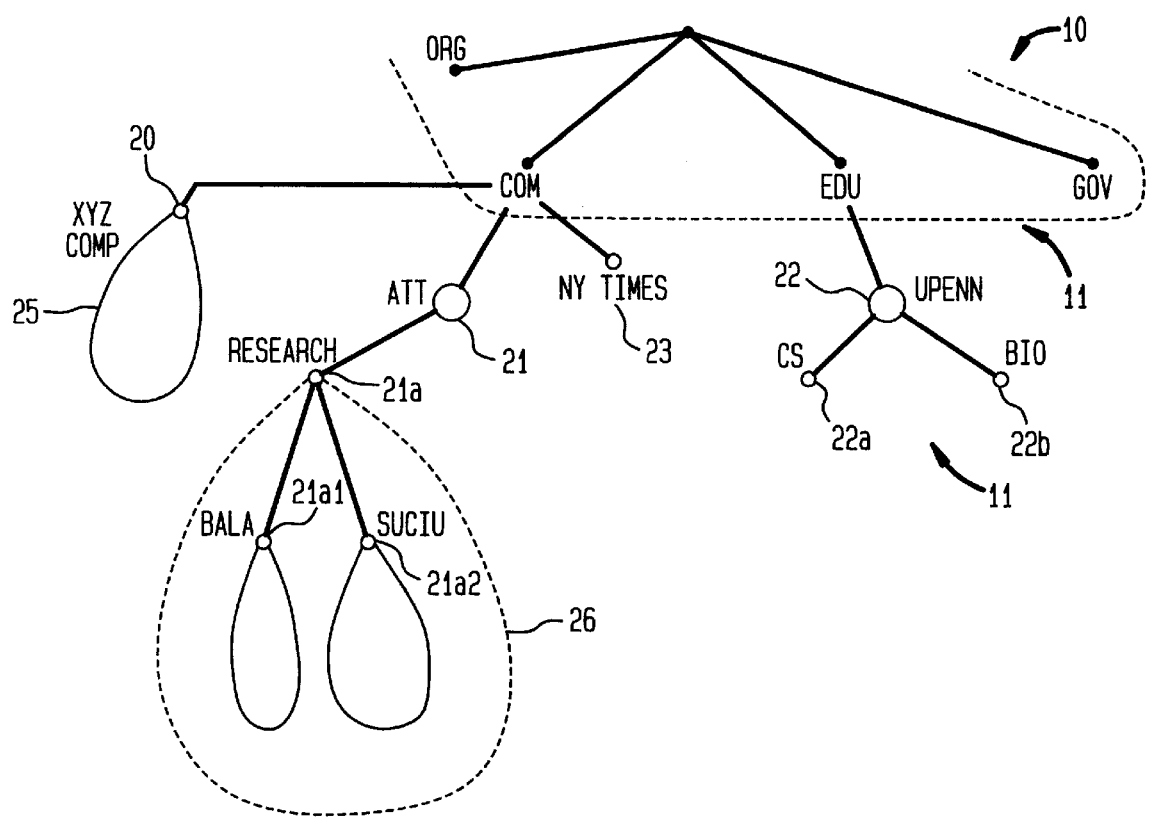
FIG. 1 illustrates an example of a hierarchically structured information space in which the present invention may be employed.

FIG. 1 illustrates a hierarchically structured information space in which the present invention can be employed. In this particular instance, the information space is a crude representation of what is commonly referred to as the World Wide Web. The structure includes a plurality of hierarchical levels. For instance, at the level 10 are nodes "org", "com", "edu", and "gov". Each of these nodes can be said to constitute the root of an entire region which includes all of the documents hierarchically below that node. For instance, at one level below the node "com" could be the nodes "xyzcomp", 20, att, 21, and nytimes, 23. Then it can be said that each of these second level nodes define roots of other more particular regions. As shown in FIG. 1, the node 20 for xyzcomp defines a root for all of the documents associated with the XYZ Computer Company defining region space 25. By contrast, node 21 may have a number of further regions defined below it, for example, the research node, 21A that defines a region 26 that includes further nodes "bala", 21A1 and "suciu", 21A2.

Thus, in connection with the web domain in the example provided thus far, the universe of documents is obtained by composing the hierarchical structure of the path-names under the hierarchical structure of the domain-names. Thus, www.research.att.com has as its successors www.research.att.com/bala and www.research.att.com/suciu. The latter has www.research.att.com/suciu/papers as a successor. A region thus consists of a sub-tree in this hierarchy.

We can think of the entire hierarchical space as constituting a universe. Then each element or node is part of the universe. A given region is defined by the node or element itself and its dependents, that is, its children, its grandchildren, etc. For example, the region for att is defined by all of the documents below node 21 in the hierarchical structure.

Figure 2:
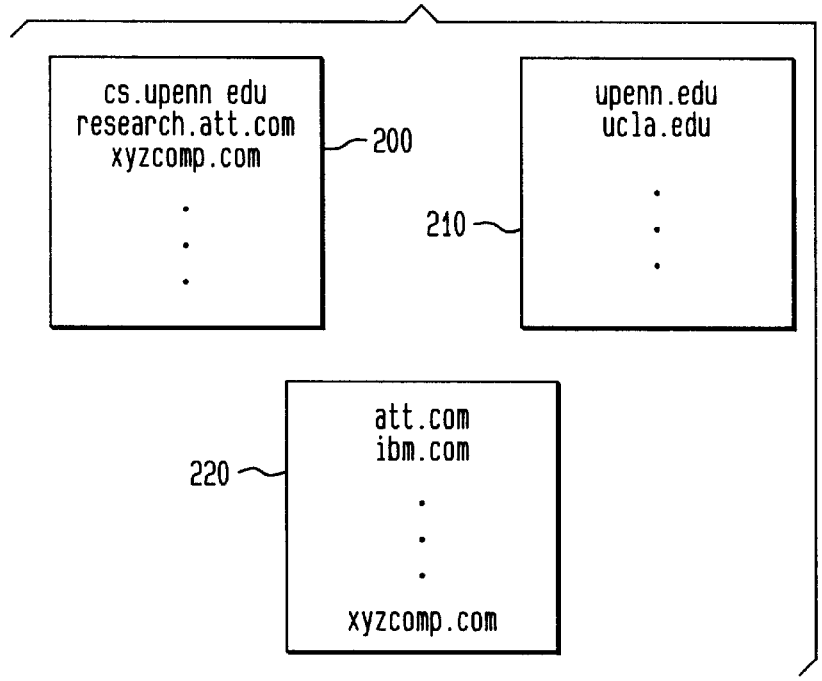
FIG. 2 illustrates examples of region-sets in accordance with an embodiment of the present invention.

A region-set is a set of regions that are related to one another based on a selected criterion. For example, in the web domain a region-set could be constituted by all of those regions corresponding to web pages of telecommunication companies. Such a region-set could be designated "Telecom-Companies". A region-set of this sort would include the root element for telecommunication companies such as AT&T, MCI, etc., namely att.com, mci.com, etc. Alternative region-sets are shown by way of example in FIG. 2. One such region-set might include all computer science research institutions having web pages. Such a list is illustrated as region-set 200 which includes cs.upenn.edu (the Computer Science Department of the University of Pennsylvania), research.att.com (the research group at AT&T), and xyzcomp.com (XYZ Computer Company) as examples. Another region-set, shown as list 210, might be directed to major universities in the United States. Examples of the contents of such a region-set include: upenn.edu, ucla.edu and others. Yet another example of a possible region-set of interest could be Fortune 500 companies, such as AT&T and IBM and our imaginary XYZ Computer Company. The region-set illustrated as 220 in FIG. 2 contains the identifiers att.com and ibm.com, xyzcomp.com, etc. representing the roots of regions associated with the Fortune 500 companies.

Each region in a region-set is specified by giving the name of the root and the region includes the entire set of documents at or hierarchically below that root. Region-sets may have common regions. For instance, the region-sets "Fortune 500 Companies" and "Telecom Companies" may both have att.com as a region. Alternatively, region-sets may have overlapping regions. For instance, the research labs at AT&T (research.att.com) is properly contained within the AT&T region (att.com).

It is important to recognize that a universe of documents can be a dynamically changing universe, that is, files are constantly being added and deleted and the entire set of URLs (Universal Resource Locators) which identify documents is continuously changing. To assure that a region-set definition is valid for a longer period of time despite the dynamic nature of the universe, the appropriate course is to specify a region by its root. The hope is that the higher in the hierarchy the root is defined the less change there will be since those nodes higher in the hierarchy change less often than points lower in the hierarchy. Thus, by specifying a region-set of research labs by enumerating only the roots of the research labs' pages, one avoids the problem that might arise from the rather frequent additions and deletions of URLS, such as those referring to research papers, inside each research lab region.

Figure 3:
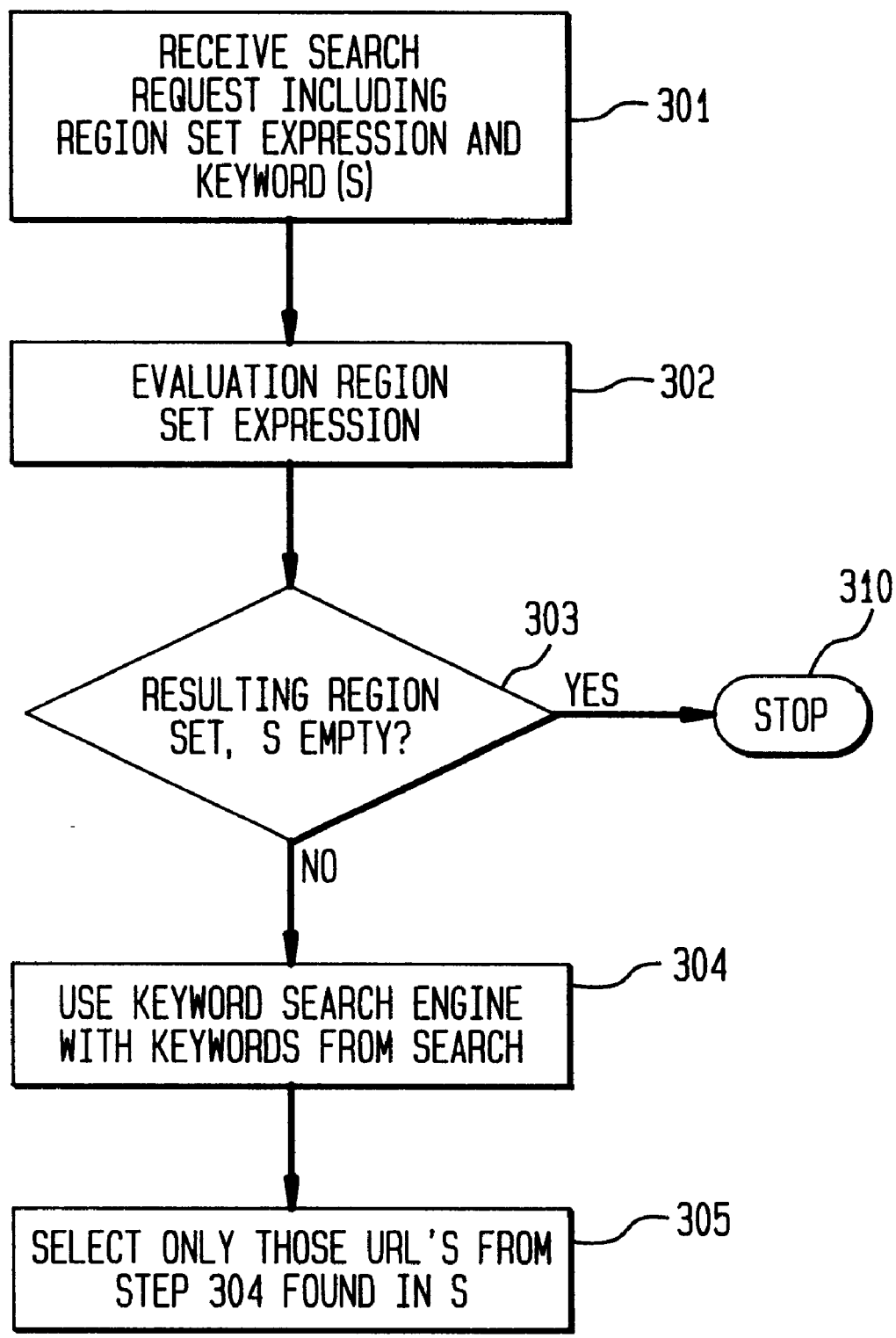
FIG. 3 provides a flow chart for implementing the present invention as a filter for a search engine.
Figure 4:
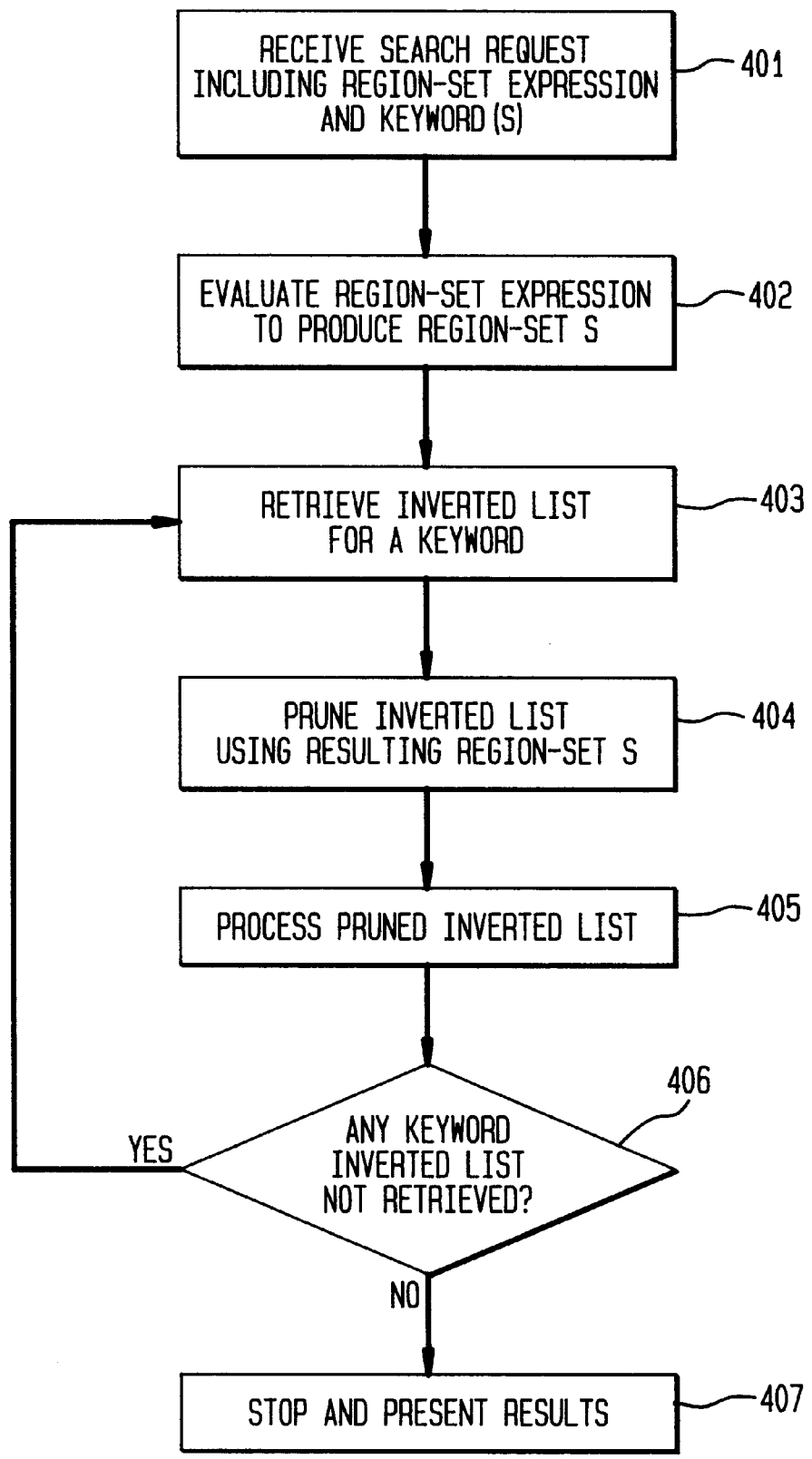
FIG. 4 provides a flow chart for implementing the method of the present invention in an integrated fashion with the operation of a search engine.

The above described region-sets can be used to focus a keyword search. When the user defines the region-set of interest and the keyword search then the search can be conducted so as to provide only results, that is documents, that satisfy the keyword criteria as well as the criteria of the region-set selected by the user. The process of implementing the combination of the keyword search and the region-set search focus will be described in further detail below when FIGS. 3 and 4 are described.

Before describing that implementation it is important to note that the present invention further provides that once a number of named region-sets have been defined it is possible to dynamically create new region-sets by applying certain operators on the already named region-sets. The operators form an algebra of region-sets in the hierarchy. As an example, consider region-set 200 of FIG. 2 as "$r_1$", consider region-set 210 of FIG. 2 as "$r_2$" and consider region-set 220 in FIG. 2 as "$r_3$". The following operators are possible in the region-set algebra defined. First, there could be a union ($\cup$) of two regions to create a third region: for instance, $r_2 \cup r_3$ would produce a new region-set that includes all major U.S. universities and Fortune 500 companies. A second operator would determine the intersection ($\cap$) of two region-sets. For instance, assume for the sake of this example that XYCOMP is one of the Fortune 500 companies, then $r_1 \cap r_3$ would yield regions which are found in both $r_1$ and $r_2$ and would include xyzcomp.com. A third operator would provide as a resulting region-set those regions from a first set that are not found in a second set (–). For instance, as in the example above, assume xyzcomp.com is common to both $r_1$ and $r_3$. Then, the operation $r_1$–$r_3$ would yield all of the elements of region-set $r_1$ that are not contained in region-set $r_3$ and xyzcomp.com would not be in the created region-set.

Additional, slightly more complex, operators are also available. In particular, it is possible to define a new region-set as being constituted by those regions of a first set that have regions of a second set. This is not strictly an intersection operation. Instead, it relates to an operation on region-sets where the region-set elements are of different levels in the hierarchy. For instance, if one wished to enumerate major universities having computer science research labs then one could perform the operation $r_2 \circ r_1$ and this operation would yield a new region-set that would include such entries as upenn.edu which corresponds to the University of Pennsylvania because $r_1$ listed cs.upenn.edu, a computer science department that is contained within upenn.edu. A variation of this operation not only gathers those regions which are beneath in the hierarchy but also those of the same level. This could be important where, for example, the Fortune 500 company has a web site only for its research lab. So, for example, the expression $r_3 \circ r_1$ does not include xyzcomp.com. However, in the modified version of this operator where $r_3 \underline{\circ} r_1$, xyzcomp.com is included as well as att.com.

Another operator $\subset$ yields those regions of the left region set that are contained in regions of the first region set. So, referring back to the three example region sets $r_1 \subset r_2$ (computer science research institutions contained in major universities) the result would be cs.upenn.edu. Note that this contrasts from $r_2 \circ r_1$ which yielded upenn.edu, a node up one level in the hierarchy from cs.upenn.edu. There is also a variation of this operator $\subseteq$ to capture an identical region that is included in both region sets.

Thus, by using this region algebra we can take already defined region-sets and create new region-sets of interest, such as Fortune 500 companies having research laboratories, to further narrow the focus of a given keyword search.

It should also be recognized that additional derived operators are possible including the negatives of the already described operators. For instance:

$S \subset S'$=those regions of S contained in regions of S'

$S \subseteq S'$=those regions the same as or contained in regions of S'

$S \triangledown S'$=$(S \subseteq S') \cup (S \supseteq S')$ $S \not\subset S'$=$S-(S \subset S')$ $S \not\subseteq S'$=$S-(S \subseteq S')$ $S \not\circ S'$=$S-(S \circ S')$ $S \not\supseteq S'$=$S-(S \supseteq S')$ As described to this point, the hierarchical universe is unsorted: that is, for some element which is an element of the universe there is no order on its successors. In practice, nodes in the universe are denoted by strings. This leads naturally to an order. Assume that each node of a tree has a name which is a string. Several nodes can have the same name but it is required that the names of all children of a given node be distinct from each other. Then each node in the tree can be uniquely identified by concatenating the names of each node along the path from the root of the tree to that node and separating them with some special character-like "/". As an example in FIG. 1, while several files or directories may have the same name, such as "papers" a unique string distinguishes each node, for example, bala/papers versus suciu/papers. Whenever the universe is represented this way it is possible to sort its elements lexicographically. In this case, the universe is an ordered hierarchy. For ordered hierarchies region-sets are represented as sorted lists of elements from the universe.

Having defined region-sets and operators for defining new region-sets based on existing region-sets, it is appropriate to turn to how the region-sets can be coupled with keyword-based queries in search engines to improve the searching operations in such hierarchically structured spaces.

The goal is to efficiently answer queries of the form: "Find all URL's matching keywords ($w_1, \ldots w_n$) in region-set s, where s may be any region-set expression including the selection of a single pre-defined region set, e.g., "Telecom Companies".

A straightforward mechanism to answer such a query is described in connection with the flow-chart of FIG. 3. In a first step, the search request including the regions-set expression and keyword(s) is received, step 301. The region-set expression s is then evaluated, step 302. (Evaluation of region-set expressions is described in further detail later in this specification.) If the expression involves operators defining a new region set, it is then determined whether the resulting region-set is empty, in step 303. If the region-set is empty, then the searching operation is stopped, step 310. If, however, the resulting region-set is not empty, then a keyword search engine is used with the keywords from the search request ($w_1 \ldots w_n$). Then the process selects only those URLs from step 304 found in the region-set s. This approach has the advantage that the filtering using the region-set expression is decoupled from the search engine. However, another mechanism may be more beneficial where the region-set s is small and the keywords ($w_1, \ldots, w_n$) match many documents, since the entire universe will still have to be searched for the keywords despite the fact that the region-set s is rather small.

In a second approach the region-set information is coupled with the internals of the search engine. Web search engines use inverted files on keywords for query processing. The inverted files, which are lists of document identifiers in a document collection that correspond to documents that contain a term, are pre-computed off-line for each term in the document collection. The region-sets can be used to prune portions of the inverted list that are processed by the search engine. Since the construction of these inverted lists is under the control of the search engine builder, it is possible to order the lists to follow the same lexicographic order as that of the region mechanism and provide a B+ tree on top of each of them. (B-trees are well known by those skilled in the art. A discussion of B-trees can be found in "The Ubiquitous B-tree" by Comer, ACM Computing Services, Vol. 11, Jun. 2, 1979, pp. 121–137.) A query is then evaluated as shown in the flow chart as FIG. 4.

In particular, the search request including the region-set expression and the keyword(s) is received in step 401. The region-set expression is then evaluated in step 402 and will be described later in the specification. Then, in step 403, the inverted list for a given keyword $w_i$ is retrieved and the entries of that list are filtered against the region-set(s) in the pruning step of step 404. The pruned inverted list is then processed using the corresponding keyword $w_1$, step 405. It is then determined whether any keyword inverted list has not yet been retrieved in step 406. If there are no such lists as yet unretrieved, then the method proceeds to step 407 and the search is stopped and results are presented. If, however, a keyword inverted list remains that has not yet been retrieved, then the process returns to step 403 and loops through steps 403 to 406 until all of the keyword inverted lists have been retrieved. The region-sets thus speed up the search engine by pruning the inverted lists to identify only those elements which satisfy the region-set expression.

The region-set expression can be evaluated by an efficient algorithm. Region-set algebra is defined over trees and there are four possible relationships between any two nodes $u_1$ and $u_2$ in the tree: $u_1$ is a proper ancestor of $u_2$, $u_1$ and $u_2$ are identical, $u_2$ is a proper ancestor of $u_1$, or none of these. Only one of these four relationships can hold between $u_1$ and $u_2$. Evaluating an expression in the region-set algebra essentially requires the ability to determine these relationships between sets of nodes. When the hierarchical structure is ordered, and the tree nodes are represented as strings as described above, these four relationships have string counterparts: the string representation of $u_1$ is a prefix for the string representation of $u_2$, the string representation of $u_1$ and $u_2$ are identical, the string representation of $u_2$ is a prefix of the string representation of $u_1$, or none of these.

The explanation of the algorithm herein refers to it as table-driven. The algorithm takes two lexicographically sorted region-sets $S_1$ and $S_2$ and one of the operators and computes a lexicographically sorted region-set $S_1$ op $S_2$. While the algorithm does not handle the union operation, the set union of two lexicographically sorted region- sets can be easily computed by simply merging the two region-sets. Given any complex expression in the region-algebra, (for example $(r_x \subset r_y) \cap r_z$), the result of an inner operator (($r_x \subset r_y$) in the example) in the expression can be pipelined to an outer operator in the expression.

The algorithm uses two pointers $P_i$ for region-set $S_i$, i=1,2, to scan the elements of the two-region-sets. Initially pointer $P_i$ i=1, 2 is positioned at the first elements of region-set $S_i$. For simplicity of presentation, assume that each of the input region-sets is terminated by a special string that is lexicographically after all the strings in the two region-sets. Suppose that at some point in the computation, pointer $P_1$ is positioned at the element $u_1$ in the region-set $S_1$ and the pointer $P_2$ is positioned at the element $u_2$ in the regions set $S_2$. For the evaluation of the operators considered by the algorithm, five possible relationships between strings $u_1$ and $u_2$ are worth distinguishing:

1. $u_1$ is lexicographically before $u_2$, while not being a proper prefix of $U_2$, denoted by $u_1 < u_2$;
2. $u_1$ is a proper prefix of $u_2$, denoted by $u_1 < u_2$;
3. $u_1$ and $u_2$ are identical, denoted by $u_1 = u_2$;
4. $u_2$ is a proper prefix of $u_1$ denoted by $u_1 >_e u_2$; and
5. $u_2$ is lexicographically before $u_1$, while not being a proper prefix of $u_1$, denoted by $u_1 > u_2$.

Since each of the operators considered by the algorithm can viewed as selecting elements from their left operand based on some property satisfied by the selected element with respect to some elements of the right operand, three possible actions can be taken when comparing $u_1$ and $u_2$:

Advance—$P_1$—nothing is output and pointer $P_1$ is advanced;

Print-$P_1$: element $u_1$ is output and pointer $P_1$ is advanced; and

Advance-$P_2$: nothing is output and pointer $P_2$ is advanced.

The algorithm terminates when $P_1$ is positioned beyond the end of the region-set $S_1$.

The following table, Table 1, summarizes the action taken by the algorithm for the various possible operators considered by the algorithm for the five relationships between strings $u_1$ and $u_2$ mentioned above.

TABLE 1

| OPERATOR | $U_1 < U_2$ | $U_1 <_e U_2$ | $U_1 = U_2$ | $U_1 >_e U_2$ | $\mu_1 > \mu_2$ |
|---|---|---|---|---|---|
| $\cap$ | Advance-P1 | Advance-P1 | Print-P1 | Advance-P2 | Advance-P2 |
|  | Advance-P1 | Advance-P1 | Advance-P1 | Print-P1 | Advance-P2 |
|  | Advance-P1 | Advance-P1 | Print-P1 | Print-P1 | Advance-P2 |
|  | Advance-P1 | Print-P1 | Advance-P2 | Advance-P2 | Advance-P2 |
|  | Advance-P1 | Print-P1 | Print-P1 | Advance-P2 | Advance-P2 |
| $\bar{V}$ | Advance-P1 | Print-P1 | Print-P1 | Print-P1 | Advance-P2 |
|  | Print-P1 | Print-P1 | Advance-P1 | Advance-P2 | Advance-P2 |
|  | Print-P1 | Print-P1 | Print-P1 | Advance-P1 | Advance-P2 |
|  | Print-P1 | Print-P1 | Advance-P1 | Advance-P1 | Advance-P2 |
|  | Print-P1 | Advance-P1 | Advance-P2 | Advance-P2 | Advance-P2 |
|  | Print-P1 | Advance-P1 | Advance-P1 | Advance-P2 | Advance-P2 |

Consider the case where the operand looks for $S_1 \subset S_2$. A region represented by String $u_1$ is in region-set $S_1$ is in the output of $S_1 \subset S_2$ provided there is a region represented by string $u_2$ in region-set $S_2$ such that $u_2$ is a proper prefix of $u_1$. This is indicated by the entry Print-$P_1$ in the Table corresponding to the column marked $u_1 >_e u_2$ and the row marked " $\subset$ ". When $u_1$ is lexicographically before or identical to $u_2$, we are guaranteed that no element in $S_2$ after $u_2$ can be used to check for the presence of $u_1$ in the result of $S_1$ contained in $S_2$; hence, pointer $P_1$ can be advanced. When $u_2$ is lexicographically before, but not a proper prefix of $u_1$ a subsequent element in $S_2$ could still be a witness to the presence of $u_1$ in the result of $S_1$ contained in $S_2$; hence, pointer $P_2$ can be advanced.

When named region-sets have large numbers of regions, the evaluation strategy of TableDrivenEval can often be improved upon to evaluate an expression in the region-set algebra by taking advantage of the availability of B+ trees on the named region-sets. If there are B± trees, it is not necessary to linearly scan the elements in a sorted region-set to compute the result of an expression in a region-set algebra. The intuition comes from trying to efficiently compute the intersection of two sorted lists.

Consider, for example, the evaluation of $S_1 \subset S_2$. Suppose that at some point in the computation, pointer $P_1$ is positioned at element $u_1$ in region-set $S_1$ and pointer $P_2$ is positioned at the element $u_2$ in the region-set $S_2$ and element $u_2$ is not a witness for the presence of $u_1$ in the output of $S_1$ contained in $S_2$. If $u_2$ is lexicographically before, but not a proper prefix of $u_1$, the first element after $u_2$ in $S_2$ that could be a proper prefix of $u_1$ could be quickly located using a B+ tree available on $S_2$. Pointer $P_2$ does not have to necessarily perform a linear scan of $S_2$. Similarly, if $u_1$ is either lexicographically before or identical to $u_2$, the first element after $u_1$ in $S_1$ that could be a proper prefix of $u_2$ could also be quickly located using a B+tree available on $S_1$; Pointer $P_1$ does not have to necessarily perform a linear scan of $S_1$.

Availability of B+ trees can thus considerably improve the computation of $S_1$ contained in $S_2$.

Having described how to evaluate a region-set expression and how to combine those region-set expressions with search engines to focus the searching operation, it is helpful to review the results of performed experiments to understand the value of the operation of the present invention. As a starting point for the study, the inventors looked at a study of actual web usage involving one of the inventors and extracted 137953 URLs comprising a little over one Gigabyte of textual data and used as input for an effectiveness study of the region-set mechanism. This was treated as a small subset of the universe of documents a web search engine would index. Region sets were then created similar to those described above, namely regions-sets directed to business-departments, computer science departments, Dow Jones-30-companies, electrical engineering departments, Fortune-500 companies, and universities. In the following tables, these region-sets are denoted by busd, csd, dj30,eed, f500 and univ, respectively. These sets were assembled partly by hand and partly by using existing lists on the Web. While the inventors tried to be as complete as possible, the lists do not actually cover the entire population; for example, several Fortune 500 companies still do not have Web sites.

Table 2 gives the number of different regions and count of document URLs from the collection for each region-set. Since the document URLs are only a sample of existing URLs, not every region in a region-set is necessarily populated. This explains why in Table 2, some region-sets have fewer documents than the number of regions.

TABLE 2

| Region-set | busd | csd | dj30 | esd | 15C0 | univ |
|---|---|---|---|---|---|---|
| Number of regions | 317 | 287 | 28 | 465 | 380 | 3033 |
| Documents in region-set | 32 | 1727 | 795 | 224 | 12746 | 11552 |

TABLE 3

| | Total | Documents in Region-sets | | | | |
|---|---|---|---|---|---|---|
| String | Matches | busd | csd | dj30 | eed | f500 | univ |
| database | 7157 | 4 | 143 | 59 | 14 | 931 | 932 |
| faculty | 2299 | 1 | 260 | 8 | 44 | 278 | 1172 |
| ipo | 290 | 0 | 3 | 2 | 0 | 20 | 10 |
| stocks | 5844 | 1 | 22 | 7 | 0 | 204 | 118 |
| telephone | 4597 | 3 | 52 | 23 | 6 | 400 | 408 |

For each of the terms ("database", "faculty", "IPO", "stocks" and "telephone") there was a search of the collection of documents. The matching sets of URLs for each of the strings were converted into a form manipulable by the tool for evaluating region-algebra expressions.

Table 3 shows how Web searches can be focused by using region-sets. Comparing the columns labeled by the six region-sets against the Total Matches column shows that only a small fraction of the inverted lists need to be examined. For example, a region search on occurrence of "stocks" in the Dow Jones-30 companies region-set shows that 7 URLs matched and a region search in the fortune-500-companies-region-set shows 204 URLs matched. The alternative, in the absence of regions, would have been to search through an inverted file containing 6,844 entries corresponding to document URLs that have an occurrence of "stocks". Performing similar queries on dynamically generated region-sets rather than named region-sets can result in even better selectivity as suggested by the following examples.

The region-set expression (universities ° eed) ° csd identifies schools that have both electrical engineering and computer science departments. The count of such schools that have matches for the term "faculty" is 740 in our database. In contrast, there are 1172 matches for "faculty" in the university region-set.

A consequence of performance improvement due to regions is that search engines can be dramatically faster since they would spend less time performing searches.

The above examples have all focused on Web pages and searches in the hierarchical structure known as the World Wide Web. These techniques are equally applicable to all hierarchical information spaces, not just the repository of Web documents.

In particular, the UNIX directory scheme groups related files together, and each directory can be viewed as a region consisting of all the files under that directory's hierarchy. Groups of related regions can be combined into a region-set. As an example, consider a typical Unix file system in a research organization where the following region-sets are natural: "DB-Group" which contains regions corresponding to the files of database people; "papers" which contains regions corresponding to technical paper files of the people in the organization; and "source-code" which contains regions corresponding to the source-code files of the people. A region-set can be stored as a list of directory names and a text file and be operated upon by referring to the file name. The actual end use of the region-sets is to specify a set of files in conjunction with tools for operations like searching, for example, copying.

The command region takes an expression in a region-set algebra and efficiently evaluates it as above. The operators are translated into standard characters available on a keyboard as shown in Table 4 below.

TABLE 4

U +
∩ *

<
<=
>
>=
∇ <=>
-<
-<=
->
->=

To locate all the directories in the example above that are related to technical papers of data-base people, we can run the following command: region "papers<DB-group". We can identify the home directories of data-base people who have source code directories as well, with the command: region "DB-group>source-code". To identify database people who have directories related to technical papers, but who do not have source code directories, it is possible to run the command: region "(DB-group>papers)*(DB-group→source code)". Equivalently it would be possible to run the command region "(DB-group>papers)→source-code". The above examples demonstrate the expressiveness of the algebra in the Unix domain.

Region-sets can also be used to improve performance of operations like search. A popular utility in the Unix domain to speed up searches in text files is GLIMPSE (HTTP://glimpse.cs.Arizona.edu). Glimpse partitions a file collection into blocks and uses a compact inverted index to aid in focused searching rather than requiring users to search the entire collection. Region-sets go a step further in letting the user dynamically specify a much narrower portion of the file-system space. For example, a user trying to locate a function implementing sort would like to restrict the search to source files such as those in the source-code region-set described above.

Glimpse operates in two stages: first it gathers the list of candidate files; it then performs a modified agrep(?) search for the pattern on the candidate file. Region-sets are interposed into Glimpse by extracting the candidate file names and filtering them via the region mechanism. This significantly reduces the actual files on which the search operation is performed. A comparison of Glimpse searching with and without regions shows dramatic speed-ups. For a performance study six synthetic regions were created from a collection of text files belonging to one of the inventors. The sets varied in percentage of the total collection from about 2% to 100% (all) by byte count. All experiments were run on a Sun Microsystems dual-CPU Sun 168 MHz ultraSparc with 524M of Main Memory.

Table 5 shows the byte count percentage of total bytes, number of files, number of regions and the time taken to search for a fixed string in each of the region- sets. When glimpse was run by itself to look for the same fixed string it took 10.5 seconds of real time. It is clear that use of region-sets offers a significant speed-up. The fixed string search appeared in approximately 19% of the blocks into which glimpse divides the file collection, thus, glimpse by itself provided a five-fold speed-up against searching the entire collection in this instance. For other search strings that occur in a (higher) or (lower) percentage of the partition blocks, the speed-up provided varied.

TABLE 5

| Region | a | b | c | d | e | all |
|---|---|---|---|---|---|---|
| Bytes | 4234925 | 5029229 | 3474170 | 4500865 | 38770611 | 190161764 |
| Percentage | 2.25 | 2.64 | 1.82 | 23.93 | 20.39 | 100. |
| Files | 190 | 357 | 345 | 3808 | 5830 | 26258 |
| Regions | 11 | 25 | 25 | 90 | 44 | 1 |
| Time (sec) | 1.409 | 1.269 | 1.486 | 2.038 | 1.583 | 14.93 |

However, as Table 6 shows using region-sets always provided a significant speed up in the experiment. Table 6 shows consistent and dramatic speed up for glimpse searches restricted to region-sets. It should be noted that no changes were made to Glimpse to take advantage of region-sets and the speed-ups would be larger if Glimpse was to be modified. The current implementation of regions has some overhead that can be seen in the increased time for processing the region-set all over running glimpse directly as shown in Table 6. Modifying Glimpse would eliminate much of this overhead.

TABLE 6

| String | Block % | Region-set times (sec) | | | | | | Glimpse Type (sec) |
|---|---|---|---|---|---|---|---|---|
| | | a | b | c | d | e | all | |
| suciu | 2.79 | .62 | .63 | .62 | .81 | .63 | 2.18 | 1.73 |
| srivesta | 13.95 | 1.15 | 1.14 | 1.14 | 1.78 | 2.48 | 14.2 | 12.8 |
| jacobson | 26.51 | 1.70 | 1.00 | 1.89 | 3.40 | 5.0 | 25 | 21.67 |
| bala | 94.88 | 4.20 | 4.70 | 4.6 | 12.6 | 17.3 | 320 | 208.42 |

(A point to note in Table 6 is the seemingly large times in the last two columns of the last row. The total bytes to be processed for searching on the string "bala" is larger than the system's disk cache. The rest of the entries benefited from fitting in the cache.)

The region-set mechanism described above enables a user to augment query keywords with a flexible specification of one or more region-sets to restrict the space of documents to be searched. The user can select one or more pre-defined collection of region-sets users or the user can dynamically create new region-sets using operators in a tree-based region-set algebra. Furthermore, a uniform and efficient table-driven evaluation of expressions in this algebra has been presented.

It will be appreciated by those skilled in the art that the above described region-set mechanism and the implementation of such a mechanism in conjunction with a search engine as described with reference to FIGS. 3 and 4 can all be realized in software running on a CPU. That CPU could be centrally located within a network operating as a shared resource. Alternatively, the software could be operated as a filter at the user's location.

What is claimed is:

1. A method of searching for documents on the world wide web, wherein a region in the web defines a space for a group of related documents, the method comprising the steps of:

defining a plurality of static region-sets wherein each static region-set comprises a plurality of regions in the web and wherein the regions in a given static region-set satisfy a particular criterion; and in response to a search request containing at least one key-word, creating a new region-set from two static region-sets in accordance with an operation criterion;

searching the web using the new region-set and at least one key-word; and presenting as a result documents that match at least one key-word and are contained in a region within said new region-set.

2. A claim depending from claim 1 wherein new region-set is used as a pre-filter.

3. A claim depending from claim 1 wherein new region-set is used with search engine.

4. A method of searching for documents on the world wide web, the method comprising the steps of:

defining a first list of URLs corresponding to nodes satisfying a first criterion;

defining a second list of URLs corresponding to nodes satisfying a second criterion;

receiving from a user a search query that includes at least one key-word;

defining a third list of URLs using said first list and said second list and a third criterion; and identifying to the user documents matching said key-word and containing a URL from said third list.

5. A method for creating a search filter, comprising the steps of:

defining a first list of URLs corresponding to nodes satisfying a first criterion;

defining a second list of URLs corresponding to nodes satisfying a second criterion, and defining a third list of URLs using said first list and said second list and a third criterion.

* * * * *